United States Patent [19]

Sato

[11] Patent Number: 4,855,629

[45] Date of Patent: Aug. 8, 1989

[54] DC BRUSHLESS MOTOR WITH THREE TEETH AND TWO WINDINGS

[75] Inventor: Hironobu Sato, Ota, Japan

[73] Assignee: Sanyo Electric Co., Ltd., Moriguchi, Japan

[21] Appl. No.: 140,665

[22] Filed: Jan. 4, 1988

[30] Foreign Application Priority Data

Jan. 14, 1987 [JP] Japan ..................... 62-6537

[51] Int. Cl.⁴ .................... H02K 21/16; G05B 19/40
[52] U.S. Cl. .................... 310/49 R; 310/68 B
[58] Field of Search .............. 310/49 R, 68 R, 68 B, 310/162, 268, 40 MM

[56] References Cited

U.S. PATENT DOCUMENTS

| | | | |
|---|---|---|---|
| 4,361,790 | 11/1982 | Laesser | 310/49 R |
| 4,495,450 | 1/1985 | Tokizaki et al. | |
| 4,600,864 | 7/1986 | Sato | |
| 4,725,752 | 2/1988 | Shiraki | 310/268 |

FOREIGN PATENT DOCUMENTS 55-12835  4/1980  Japan .
59-18940  5/1984  Japan .
59-139883  8/1984  Japan .

Primary Examiner—Patrick R. Salce
Assistant Examiner—D. L. Rebsch
Attorney, Agent, or Firm—Wenderoth, Lind & Ponack

[57] ABSTRACT

A brushless DC motor includes a rotor having a rotor shaft, rotor core and two different magnetic poles disposed around the rotor core, a stator having a circular aperture for receiving the rotor therein and a plurality of magnetic pole teeth consisting of a first tooth, a second tooth and a third tooth disposed on a circumference of the aperture at almost regular intervals. The stator has a first yoke portion for connecting the first tooth and the second tooth, a second yoke portion for connecting the second tooth and the third tooth, a first winding wound on the first yoke portion, a second winding wound on the second yoke portion, and a control device for controlling electrical conduction states of the first winding and the second winding according to the rotational position of the rotor.

3 Claims, 7 Drawing Sheets

| Patterns | Terminal a | Terminal b | Terminal c |
|---|---|---|---|
| I | H | — | L |
| II | — | H | L |
| III | L | H | — |
| IV | L | — | H |
| V | — | L | H |
| VI | H | L | — |

DC BRUSHLESS MOTOR WITH THREE TEETH AND TWO WINDINGS

BACKGROUND OF THE INVENTION

The present invention relates to a brushless DC motor comprising a rotor and a stator having a plurality of magnetic pole teeth, and is particularly concerned with the miniaturization and the high operating efficiency of such a brushless DC motor.

A prior art brushless motor having three teeth is known as disclosed in Japanese Patent publication No. 55-12835(1980). A stator of the motor mentioned in the publication has three stator magnetic poles (teeth) disposed at regular intervals (at every 120 degrees) on a circle concentric with the rotating shaft of a permanent magnet rotor, and users stator core for coupling the stator magnetic poles with a yoke disposed on a circle concentric with the rotating shaft. A field winding is wound on each of the stator magnetic poles. Accordingly, an electric current is fed to the three field windings successively to generate a rotational magnetic field.

In the prior art brushless motor constructed as above, since there is no split provided on the yoke, it is necessary to start winding the field windings from inside the stator, and thus the efficiency of manufacture is deteriorated due to the breakage of the windings easily at the time of this winding.

Further, an increase in the number of the field windings may result naturally in an increase in the number of crossovers among the field windings, thus further reducing the efficiency of manufacture.

In addition the size of the motor increases with an increase in the number of stator magnetic poles, which prevents the miniaturization of the motor.

In view of such problems, an attempt was made to realize a small brushless motor with the number of stator windings reduced from three to two, however, the combination and timing of the current fed to the stator windings became difficult, thus leaving another problem that prevents the enhancement of the thermo operating efficiency.

Meanwhile, a conventional small motor is structured, for example, as disclosed in Japanese Patent Publication No. 59-18940(1984). The induction motor mentioned in the publication is structured such that core parts of the stator core on which a coil is wound are punched separately out of a steel plate, built up in layers, and after the coil is wound on the core parts, the core parts are held between legs of the stator core to form a stator.

When assembling the small motor as above, or more particularly when forcibly fitting the core parts between legs of the stator core, the squareness formed by the legs and the core parts must be carefully controlled, thereby reducing the efficiency of manufacture. The fabrication becomes difficult as the number of interfaces at the time of fitting increases, and thus is extremely difficult, when the number of interfaces is high. In addition, forcible fitting of the core parts while controlling squareness in the structural relationship between the core parts and legs may introduce an unreasonable force, thus entailing (i) a deformation of the core or particularly of pole separating parts, as notches; (ii) degradation of roundness in the bore of the stator; (iii) a separation of the iron plate at a press-fit zone to cause a defective stator core, and thus the characteristics of the motor degenerate, and vibrations occur more severely.

SUMMARY OF THE INVENTION

In view of the problems mentioned above, an object of the invention is to provide a small-sized brushless DC motor which is easy to manufacture and adapted for miniaturization.

Another object of the present invention is to provide a small brushless DC motor in which its operating efficiency is enhanced by improving the location of a position detector for switching current fed to stator windings.

Still a further object of the invention is to provide a small brushless DC motor that permits core parts to be easily fitted in even when the stator is provided with three legs.

The present invention provides a DC brushless motor comprising a rotor having a rotor shaft, a rotor core and permanent magnets disposed around said rotor core, a stator core having a circular aperture for receiving said rotor therein and three magnetic pole teeth consisting of a first tooth, a second tooth and a third tooth disposed on a circumference of the aperture almost at regular intervals, a first yoke portion for connecting said first tooth and said second tooth, and a second yoke portion for connecting said second tooth and said third tooth. The motor comprises two stator windings, one of the windings being wound on the first yoke portion and the other of the windings being wound on the second yoke portion, and a control device for controlling electrical conduction states of the two stator windings according to a rotational position of the rotor. A rotational position sensor can be disposed on the stator core for detecting a rotational position of the rotor. Preferably, the rotational position sensor is located at a constant angle around the rotor shaft so that the constant angle $\alpha$ is set to satisfy $15° \leq \alpha \leq 25°$.

In an embodiment of the present invention, the first tooth has a first yoke part extending in one direction, and the third tooth has a third yoke part extending in one direction identical to the extending direction of the first yoke part to provide a spaced parallel relation of the first and third yoke portions, and the second tooth has a second yoke part extending in the same direction as that of the first and third yoke parts.

In another embodiment of the present invention, a DC brushless motor comprises a rotor having a rotor shaft, a rotor core and permanent magnets disposed around the core, a stator core having a circular aperture for receiving the rotor therein and three magnetic pole teeth consisting of a first tooth, a second tooth and a third tooth disposed on a circumference of the aperture almost at regular intervals, a first yoke portion connected at its one end to the first tooth, a second yoke portion connected at its one end to said second teeth, a third yoke portion connected at its one end to the third tooth, and a core portion connected to other ends of each of the first, second and third yoke portions. The motor has two stator windings, one being wound on a part of the core portion and the other on another part of the core portion, and a control device for controlling electrical conduction states of the two stator windings according to a rotational position of the rotor. The first, second and third yoke portions are in a parallel relationship with one another on a plane and these yoke portions make contact with the core portion at substantially right angles.

In the above-described construction, the stator core can be assembled by simply aligning centers of the circular apertures, the core portion can easily be fitted in despite the dislocating of the core portions from the centers of the circular apertures, and a deterioration in the characteristics due to a dislocation of the core portion can be prevented.

DETAILED DESCRIPTION OF PREFERRED EMBODIMENTS

Like reference numerals represents like parts in the different views of the drawings.

Figure 1:
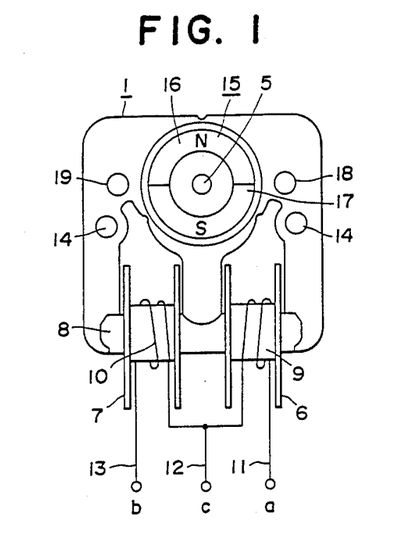
FIG. 1 is a front view of a stator and a rotor embodying the invention.
Figure 2:
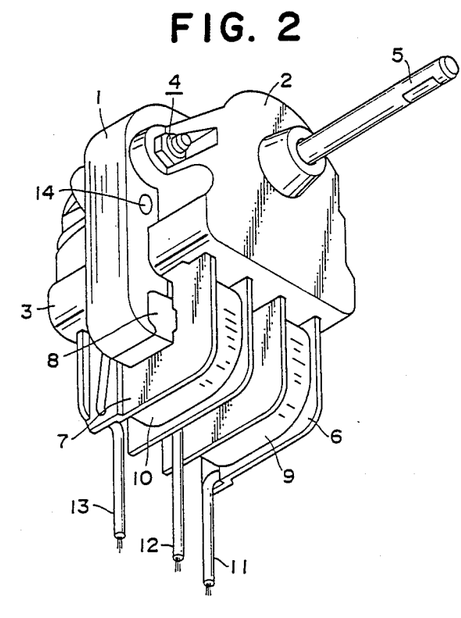
FIG. 2 is a perspective view showing a motor wherein a bearing part is mounted on the stator and the rotor shown in FIG. 1.

In FIG. 1 and FIG. 2, the brushless motor of the invention has a stator 1, which preferably is a laminated stator core composed of a plurality of electrical steel sheets punched out in a skeleton shape and superposed in layers, bearing parts 2, 3 fixed on the stator 1 with a bolt 4, a rotor 15 having a rotating shaft 5, a core 8 having bobbins 6, 7, a first winding 9 and a second winding 10 wound on the bobbins 6, 7 respectively, and permanent magnets 16, 17 provided on an outer periphery of the rotor 15. The first winding 9 has a winding start leader line 11 and a winding end leader line 12, and the second winding 10 has a winding end leader line 13. A start of the second winding 10 is connected to the leader line 12 of the first winding 9. In the drawings, reference numeral 14 denotes a through hole used for mounting the motor to other equipment, and reference numerals 18 and 19 denote through holes for allowing the bolt 4 therethrough.

Figure 3:
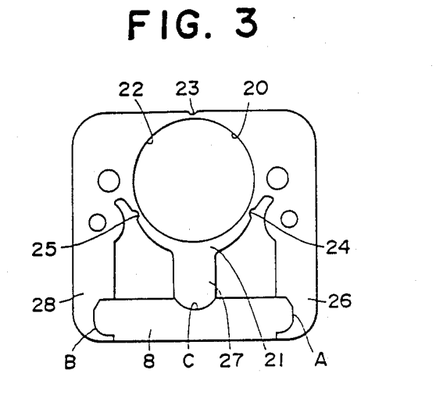
FIG. 3 is a front view of a core used on the stator shown in FIG. 1.
Figure 4:
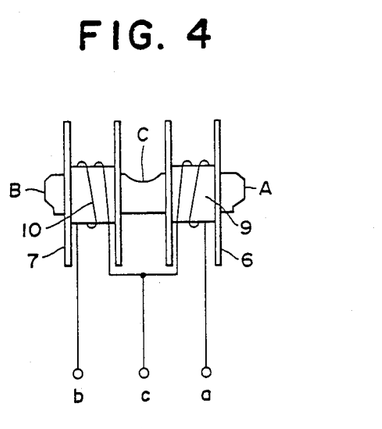
FIG. 4 is a front view showing a first and second windings of the stator shown in FIG. 1.

In FIG. 3, teeth (magnetic poles) 20, 21, 22 are disposed on a circumference of the circular aperture for containing the rotor 15 therein and provided at intervals of 120 degrees. These teeth 20, 21 22 are separated magnetically by pole separation grooves 23, 24, 25. In addition to the form illustrated therein, the grooves can be formed into notches as disclosed in U.S. Pat. No. 4,600,864 of July 15, 1986 to the present inventor. The first tooth 20 has a yoke part 26, which is connected to an end portion of the core 8. Similarly, the second tooth 21 has a yoke part 27, which is connected to a center C of the core 8, and the third tooth 22 has a yoke part 28, which is connected to an end portion B of the core 8. The yoke part 26, the portion between end portion A and center C of the core 8 and the yoke part 27 are connected with each other to constitute a first yoke portion. Then, the yoke part 27, the portion between center C and end portion B of the core 8 and the yoke part 28 are connected likewise to constitute a second yoke portion. When assembling such a core, a core structure having the first yoke portion, the second yoke portion and the first to third teeth 20, 21, 22 are punched out of an electric steel plate, which is then built up in layers. The core 8 will be formed likewise by building up steel plates. Next, the stator shown in FIG. 1 is obtainable by press-fitting the core 8, which has the bobbin 6 and the first winding 9 mounted between the end portion A and the center C thereof and the bobbin 7 and the second winding 10 mounted between the end portion B and the center C, as shown in FIG. 4, in the space between the yoke parts 26, 27, 28.

In the present invention, the yoke part 26 of the first tooth 20 and the yoke part 28 of the third tooth 22 extend in one direction in a parallel spaced relation, and the yoke part 27 of the second tooth 21 is disposed intermediate the space between the yoke parts 26 and 28 to thereby form a generally "E" shaped structure as illustrated well in FIG. 3.

Figure 5:
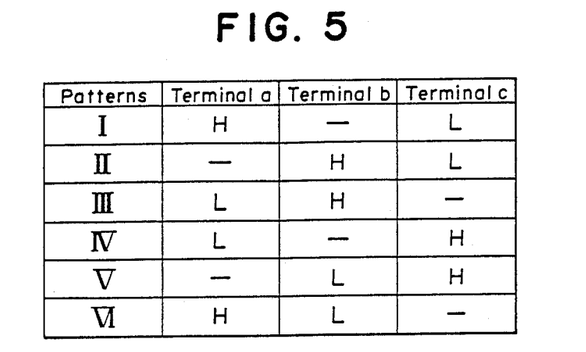
FIG. 5 is an explanatory table showing a state wherein a voltage is impressed on the first and second windings.
Figure 6:
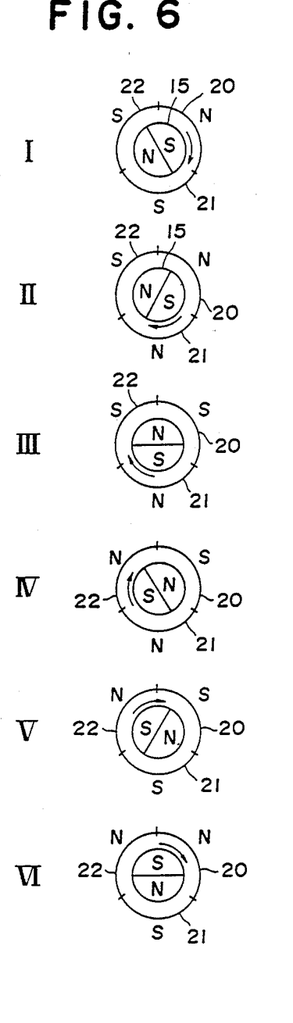
FIG. 6 is the diagram explaining a rotational positions of the rotor when voltage of the pattern shown in FIG. 5 is impressed on the first and second windings.

For rotating (clockwise, for example) the rotor 51 by means of the stator 1 shown in FIG. 1, voltages shown in FIG. 5 will be impressed on terminals of the first and second windings 9, 10. That is voltage impression patterns I to VI will be provided during one revolution of the rotor 15. The patterns may be changed over every 60 degrees or so through detecting a rotational position of the rotor 15. A detection of the rotational position of the rotor 15 will be exemplified in and described with reference to an electric circuit of FIG. 7. An "H" in FIG. 5 indicates a substantial power voltage, "L" indicates the substantial ground voltage, and a current flows in the direction from "H" to "L". A "—" indicates that a terminal is left open. FIG. 6 illustrates the magnetized state of each of the teeth 20, 21, 22 in the patterns I to VI. In FIG. 6, "I" indicates a magnetized state of each of the teeth 20, 21, 22 when the pattern I of FIG. 5 is employed, the tooth 20 indicates an N-pole, the tooth 21 indicates an S-pole and the tooth 22 also indicates an S-pole, and a stop position of the rotor 15 is as shown in I of FIG. 6. Next, when a voltage is impressed on the windings 9, 10 according to the pattern II of FIG. 5, the tooth 20 indicates an N-pole, the tooth 21 indicates an N-pole and the tooth 22 indicates an S-pole, and the rotor 15 comes to stop at a position turned 60 degrees clockwise from the stop position shown in I of FIG. 6. Then, when a voltage on the windings 9, 10 is impressed according to the pattern III of FIG. 5, the rotor 15 rotates another 60 degrees to a position shown in III of FIG. 6. Thus, the rotor 15 rotates 60 degrees for each successive changing-over of the patterns. It is to be remembered that the above-described example represents a case where the first and second windings 9, 10 are wound as shown in FIG. 1; and when the winding manner of the first and second windings 9, 10 is changed, the rotor rotates similarly if the conditions of the patterns I to VI shown in FIG. 5 are modified.

If the brushless motor of the invention which is constructed as above and the prior art brushless motor having three teeth and three windings are both designed to have the same output, then the full magnetomotive forces of both the motors will be the same. In this case, a mean current flowing in the prior art motor (delta connection) is $\frac{3}{4}$ I which is obtained by the formula $(\frac{1}{2}I+\frac{1}{4}I)\times 3 \times \frac{1}{3}$, and a mean current for the motor of the invention is 5/6 I, which is obtained by the formula $(I+I+\frac{1}{2}I)\times \frac{1}{3}$. Accordingly, the motor according to the invention permits 111% which is obtained by the formula $5/6I \div \frac{3}{4}I$ as much current to flow as that for the prior art motor. Accordingly, for equal full magnetomotive forces N I (N being the number of turns of a winding), the same output will be obtainable with the same current as in the prior art by increasing the number of winding on each coil to 1.11 times that of prior art in the present invention. Since two windings are provided in the present invention, the total windings can be made fewer in quantity than with the prior art motor even if one winding is increased to 1.11 times its prior art value thus realizing a miniature and lightweight construction of the motor.

Figure 7:
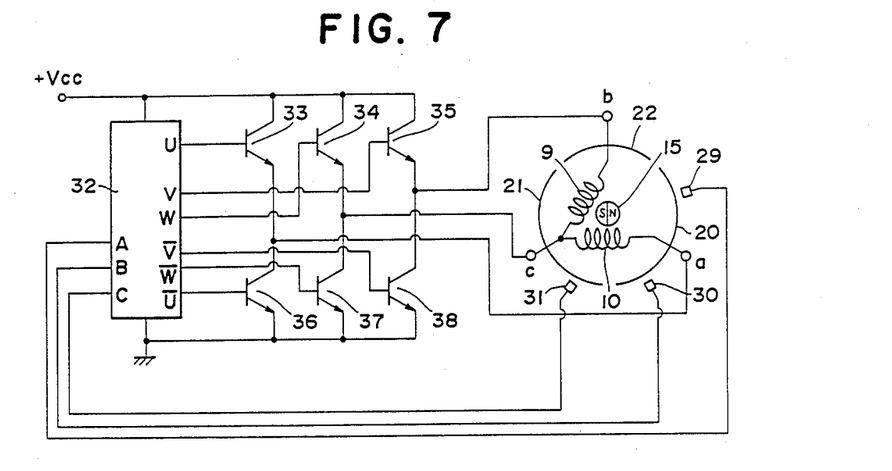
FIG. 7 is an electric circuit diagram for impressing a voltage of the pattern shown in FIG. 5 on the first and second windings.
Figure 8:
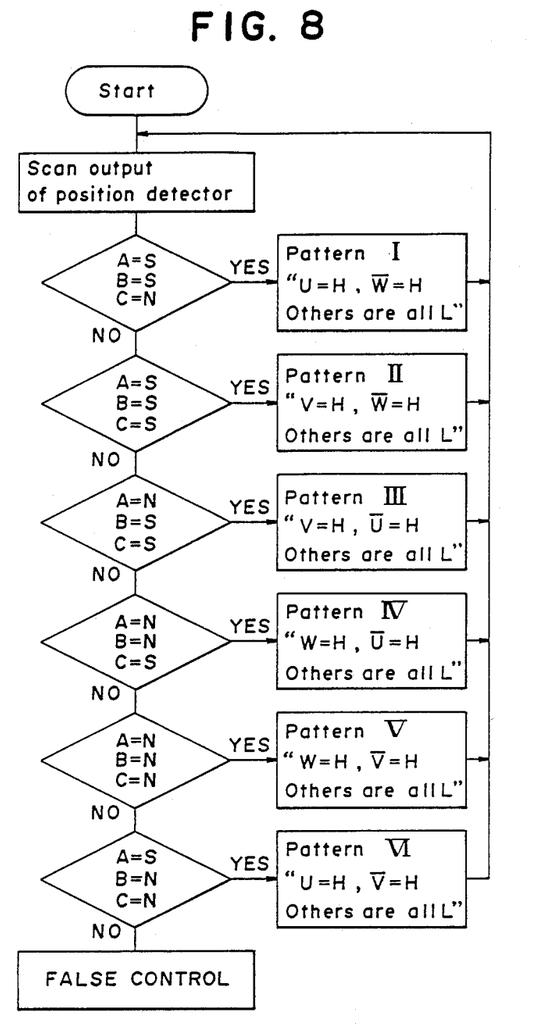
FIG. 8 is a main part flow-chart showing a main operation of a microprocessor shown in FIG. 7.

FIG. 7 is an electric circuit diagram representing one embodiment of a control device used for the present motor of the invention. In the drawing, reference numerals 29, 30, 31 denote electrical rotational position sensors such as Hall generators for detecting a rotational position of the rotor 15, which are disposed at intervals of 60 degrees at positions concentric with the rotating shaft of the rotor 15. By disposing the position sensors 29, 30, 31 as above, an output of a different combination is obtainable every time the rotor 15 rotates 60 degrees. Outputs of the position sensor 29, 30, 31 are given to a microprocessor 32. The microprocessor 32 controls transistors 33 to 38 for on/off operation according to the outputs of the position sensors, thereby supplying voltages of the patterns I to VI shown in FIG. 5 on the windings 9, 10. When the position sensors 29, 30, 31 are disposed at positions shown in FIG. 7, the main operations of the microprocessor 32 will be shown by means of the flow-chart of FIG. 8. Other electrical position sensors can be used such as magnetic wires, coils, magnetic diodes and photo-couplers.

Figure 16:
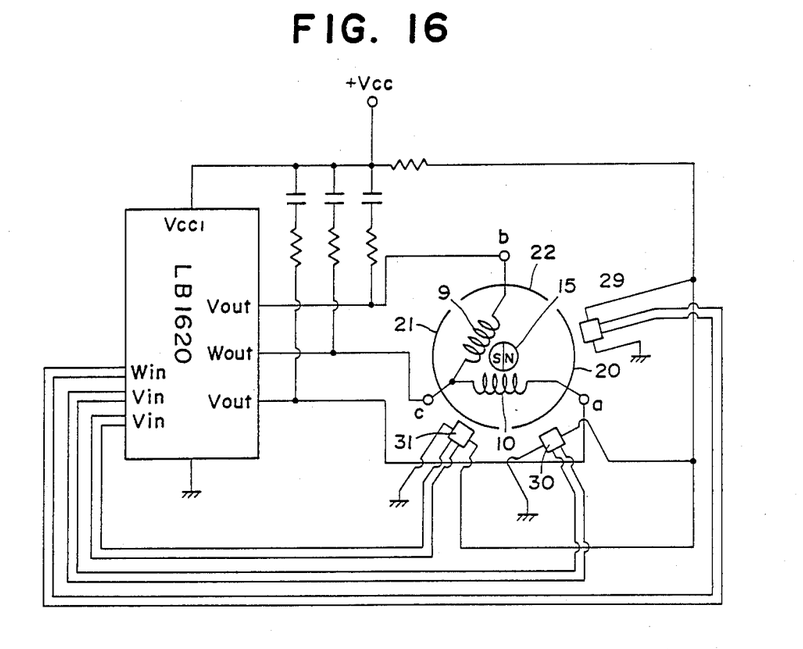
FIG. 16 is an electric circuit diagram of a control device according to another embodiment of the present invention.

In addition to the above-described embodiment, the control device for driving can be constructed by using, for example, an electric circuit employing IC LB1620 produced by Sanyo Electric Co., Ltd., the present assignee, as shown in FIG. 16 and an electronic circuit disclosed in U.S. Pat. No. 4,495,450 assigned to the present assignee and its corresponding Japanese Unexamined Patent Publication No. 59-139883 (1984), filed in the name of the same assignee as the present application. This publication discloses the detection of a rotational position of the rotor from a voltage induced on the winding, thereby changing over the current fed to windings. Terminals a, b, c of the present invention may be connected directly to an output end of that circuit, as illustrated in FIG. 17.

A more detailed explanation of the electric circuit without a position sensor will be explained with reference to FIG. 17.

Figure 17:
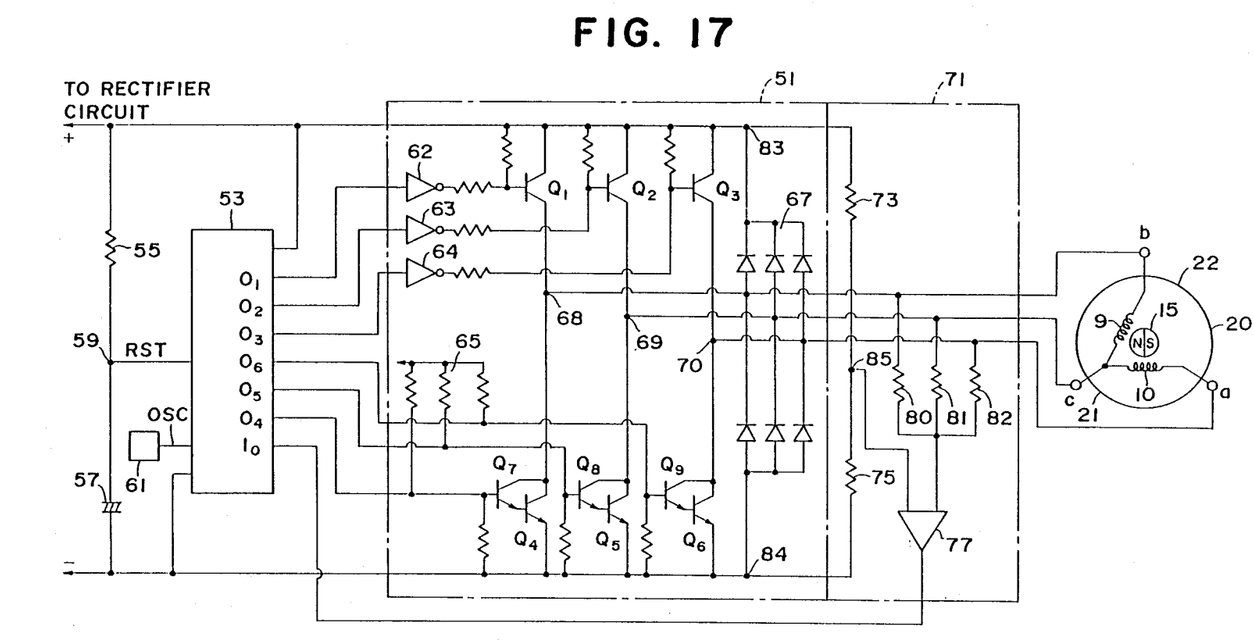
FIG. 17 is an electric circuit diagram of the control device according to a further embodiment of the present invention.

In FIG. 17, an inverter 51 is connected to a rectifier circuit (not shown) so that direct current power is supplied therefrom. A control circuit 53 has a microcomputer as will be described below. Between a plus (+) terminal and a minus (−) terminal of the rectifier circuit, a series connection of a resistor 55 and a capacitor 57 are connected so as to have the connection point 59 which outputs a reset signal RST to the control circuit 53 at the time of turning on the power source. The control circuit 53 is further connected to a clock generator 61, from which an oscillation signal OSC is inputted. The control circuit 53 has output ports $O_1$ to $O_6$ and input ports $I_1$ to $I_3$. The output ports $O_1$ to $O_3$ are connected to transistors $Q_1$ to $Q_3$ through inverting amplifiers 62, 63, 64, respectively, and the output ports $O_1$ to $O_6$ are connected to transistors $Q_7$ to $Q_9$, respectively. The transistors $Q_7$ to $Q_9$ and transistors $Q_4$ to $Q_6$ form Darlington connections, respectively. The transistors $Q_7$ to $Q_9$ are connected to a power source input 65 for supplying base bias. The transistors $Q_1$ to $Q_6$ are turned on in response to high level signals from the output ports $O_1$ to $O_6$. These transistors $Q_1$ to $Q_6$ constitute a well-known three-phase bridge circuit. For the transistors $Q_1$ to $Q_6$, an electric circuit 67 is provided for the purpose of protecting them from spike voltages caused at the time of switching for conduction to the two stator coils 9 and 10. The connection points 68 and 70 are connected respectively to the stator coils 9 and 10, respectively, through terminals b and a and the connection point 69 is connected to both the stator coils 9, 10 through a terminal c as illustrated in FIG. 17. In a motor using the control device in this structure of FIG. 17, it is not necessary to provide any position detectors as Hall generators as applied required in the previous embodiment of FIGS. 7 and 16. Instead, a rotor position detection circuit 71 has voltage dividing resistors 73 and 75 and a comparator 77 which is connected to the connection points 68, 69 and 70 and terminals b, c and a, respectively through resistors 80, 81 and 82. The voltage dividing resistors 73 and 75 are connected in series with each other and connected to the connection points 83 and 84, that is, the plus (+) terminal and the minus (−) terminal of the aforementioned rectifier circuit. The connection point 85 between the resistors 73 and 75 serves as a virtual neutral point so as to provide a neutral voltage to one input of the comparator 77. The other input of the comparator 77 is connected to the terminals a, b, c through the resistors 80, 81, 82 as described, and the output of the comparator 77 is connected to input ports $I_1$ to $I_3$ of the control circuit 53. Thus, the rotor in this embodiment of FIG. 17 is detected by utilizing the voltage induced in the stator coils due to the rotation of the rotor. Such an induced voltage is fully disclosed in aforementioned U.S. Pat. No. 4,495,450 and therefore will not be described presently.

Figure 9:
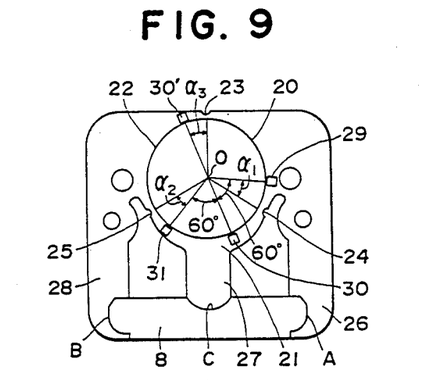
FIG. 9 is a front view of the stator core shown in FIG. 3 wherein a position sensor is mounted on the stator core.

FIG. 9 is a front view showing a state where the position sensors 29, 30, 31 are actually mounted on the stator core shown in FIG. 3. In the drawing, a reference numeral 0 denotes a central position of the rotating shaft 5, namely a central position of the aperture for receiving the rotor 15 therein. The position sensors 29, 31 are mounted at positions turned $\alpha_1$, $\alpha_2$ degrees (about 20°)

counterclockwise from the pole separate grooves 24, 25 respectively on the concentric circle around the central position 0. The position sensor 30 is provided at an intermediate position of the position sensors 29, 31, that is, a position turned 60° from the position sensors 29, 31. The position of the sensors is a spot symmetrical to an installation position of another position sensor 30' with reference to the central position 0. Both the positions are those at which polarities of the field to be detected by them are inverted from N to S and vice versa; therefore, the same detection value as that by the position sensor 30 will be obtained by inverting a polarity of the field detected by the position detector 30. That is, the position sensor 30' is mounted at a position turned $\alpha$ degrees (about 20°) counterclockwise from the pole separate groove 23 on the concentric circle around the central position 0, and hence the same effect as in the case where the position sensors 29, 30, 31 are installed at every 120° around the central position 0 is substantially obtainable.

Figure 10:
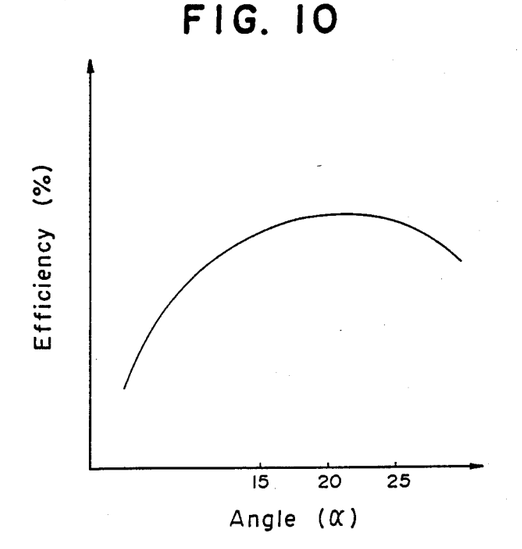
FIG. 10 is a graphical diagram explaining an operating efficiency of the motor shown in FIG. 2.

FIG. 10 is an explanatory diagram showing a relationship obtained experimentally between an efficiency of the motor and rotational angle $\alpha$ with respect to the pole separate groove when the position sensors 29, 31 of the above-described brushless motor are mounted. As will be apparent from the drawing, better efficiency will be obtained from when the angle of rotation is 20°.

Figure 11:
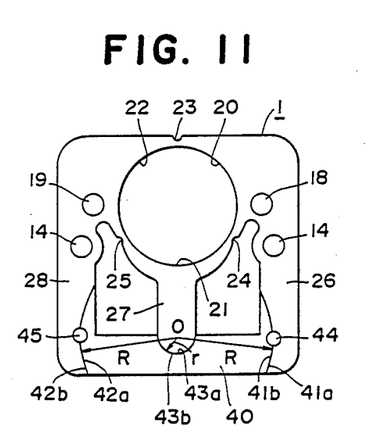
FIG. 11 is a front view of a stator core of another embodiment of the present invention.
Figure 12:
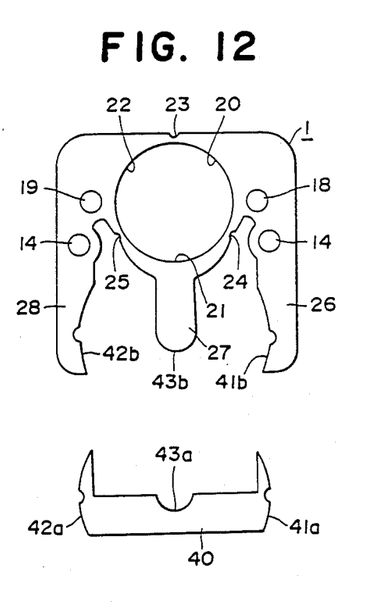
FIG. 12 is a front view of a stator core with a core part demounted from the stator core shown in FIG. 11.

In FIGS. 11 and 12 which show another embodiment of the invention, a shape of the core 40 is different from the stator shown in FIG. 1. A function 41a, 41b of the yoke 26 and the core 40 and a junction 42a, 42b of the yoke 28 and the core 40 constitute arcs of a circle having the radius R around the center 0. A junction 43a, 43b of the yoke 27 and the core 40 constitutes also an arc of a circle having the radius r around the center 0. The radius r is smaller than the radius R.

When fitting the core 40 in the stator 1 constructed as above, the core 40 is dislocated only in the direction of rotation around the center 0. Accordingly, it can easily be fitted by simply giving attention to the direction of dislocation. Further, the core 40 can also be fitted notwithstanding a minute dislocation around the center 0, and if fitted in a minutely dislocated state, junctions 41a, 41b, 42a, 42b, 43a and 43b are all the time in constant junction state, and thus the properties of the motor will never deteriorate.

Reference numerals 44, 45 denote through holes for inserting therethrough guide pins of a jig used for fitting the core portion 2 in the stator core 1.

Figure 13:
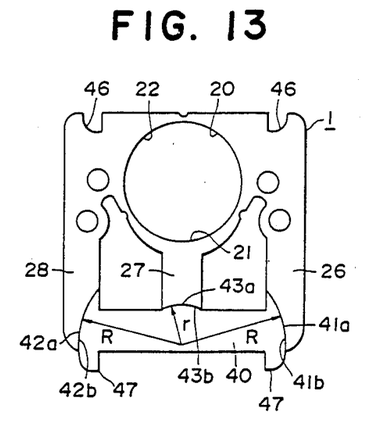
FIG. 13 is a front view of a stator core of a further embodiment of the present invention.
Figure 14:
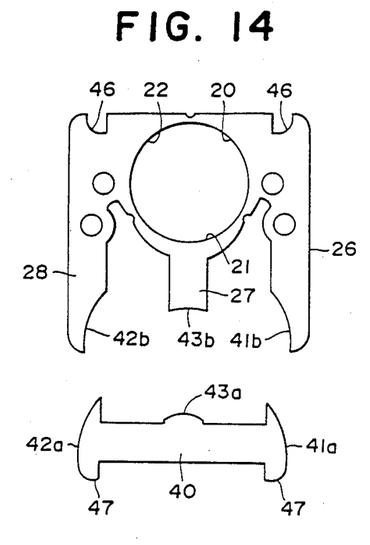
FIG. 14 is a front view of a stator core with a core part demounted from the stator core shown in FIG. 13.

FIGS. 13 and 14 show a further embodiment of the invention. In this embodiment, the center 0 is shifted from the yoke 27 to the core 40. The junctions 41a, 41b, 42a, 42b, 43a, 43b, change in shape accordingly. Further, 46 denotes a notch, which is so shaped as to fit a salient 47 of the core 40 therein. An electrical steel plate for the core can thus be punched continuously to minimize scraps. Then, since the center 0 is on the lower portion of the core 40, a force for fitting in the core 40 is dispersed uniformly to the junctions 41a, 41b, 42a, 42b, 43a, 43b, thus facilitating the fitting thereof.

According to the invention, the stator has the first yoke portion connecting a first tooth and a second tooth, a second yoke portion connecting the second tooth and a third tooth, a first winding wound on the first yoke portion, a second winding wound on the second yoke portion, and comprises rotational position sensors provided at positions turned almost 20 degrees in the same direction around a rotating shaft from pole separate positions between the adjacent teeth of the stator, and a control device for controlling current fed to the first and second windings according to the output of the rotational position sensors, therefore, a three-toothed brushless motor can be driven with two windings in the motor constructed as above, and thus the motor can be miniaturized in proportion to the decrease in the number of the motor windings. Then, an angle for mounting the rotational position sensor is determined at the same time, and the motor operating efficiency is improved.

Accordingly, a miniaturization and higher efficiency can be attained concurrently for the motor because of the shape of the stator and the mounting positions of the rotational position detecting sensors.

Figure 15:
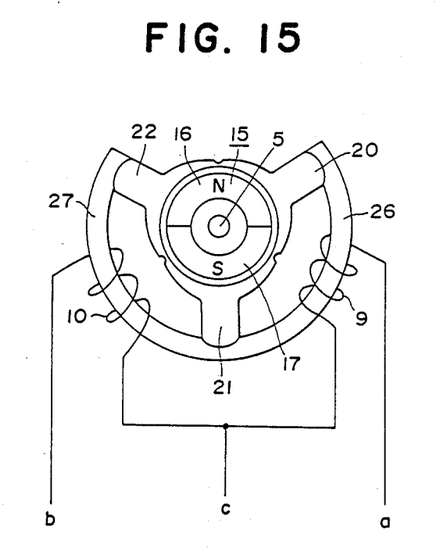
FIG. 15 is a front view of a stator and a rotor of another embodiment of the present invention, showing a stator schematically.

In FIG. 15 which shows a further embodiment of the invention, the stator has first, second, and third teeth (20, 21 and 22), a first yoke 26 connecting the first tooth 20 and the second tooth 21, a second yoke 27 connecting the second tooth 21 and the third tooth 22. A first winding 9 and a second winding 10 are wound on the first yoke 26 and the second yoke 27, respectively. A similar effect will be obtainable by winding the first winding 9 and the second winding 10 directly on the first tooth 20 and the second tooth 21, respectively. The three-toothed brushless motor can be driven with two windings. Accordingly, the windings can be made fewer in number than a prior art three-toothed brushless motor, thus attaining miniaturization of the motor. Furthermore, the efficiency of manufacture at the time the motor assembly can be improved in proportion to the decrease in the number of the windings, as in the previous embodiments.

The foregoing description illustrates specific embodiments within the scope of the present invention and are not to be construed as limiting the scope. It is to be understood that variations and modifications thereof may be made by those skilled in the art without departing from the scope of the invention.

What is claimed is:

1. A DC brushless motor comprising:
   a rotor having a core and having two different magnetic poles disposed around said rotor core;
   a stator core having a circular aperture for receiving said rotor therein and having three teeth consisting of a first tooth, a second tooth and a third tooth; wherein said first tooth, said second tooth and said third tooth are positioned on a circumference of said circular aperture at a constant angular intervals; said stator core having a first yoke portion having an end connected to said first tooth, a second yoke portion having an end connected to said second tooth, a third yoke portion having an end connected to said third tooth, and a bridge portion connected to other ends of each of said first, second and third yoke portions;
   three magnetic position sensors for detecting a rotational angle of said magnetic poles of said rotor and for providing outputs corresponding thereto, said magnetic position sensors being provided at a position turned a constant angle $\alpha$ with respect to said bridge portions in one direction around said circular aperture;
   two stator windings consisting of a first winding and a second winding; said first winding being wound on a part of said bridge portion, and said second winding being wound on another part of said bridge portion;

three terminals consisting of terminal (a), terminal (b) and terminal (c); said terminal (a) being electrically connected to an end of said first winding; said terminal (b) being electrically connected to an end of said second winding; and said terminal (c) being electrically connected to another end of said first winding and to another end of said second winding; and a control device having six patterns for energizing at least one of said first and second windings via said terminals (a), (b), and (c);

wherein said six patterns include:

a pattern I for magnetizing said first tooth as an N-pole and for magnetizing said third tooth as an S-pole;

a pattern II for magnetizing said second tooth as an N-pole and for magnetizing said third tooth as an S-pole;

a pattern III for magnetizing said second tooth as an N-pole and for magnetizing said first tooth as an S-pole;

a pattern IV for magnetizing said third tooth as an N-pole and for magnetizing said first tooth as an S-pole;

a pattern V for magnetizing said third tooth as an N-pole and for magnetizing said second tooth as an S-pole, and a pattern VI for magnetizing said first tooth as an N-pole and magnetizing said second tooth as S-pole;

wherein said control device changes from one of said patterns to another of said patterns in accordance with said outputs of said three magnetic position sensors in a predetermined order so as to thereby generate a rotational magnetic field for mechanically rotating said rotor.

2. A DC brushless motor according to claim 1, wherein said first yoke portion, said second yoke portion and said third yoke portion are in a parallel relationship with one another on a plane and contact said core portion at substantially right angles on a plane.

3. A DC brushless motor according to claim 1, wherein said constant angle $\alpha$ satisfies the following:

$$15° \leq \alpha \leq 25°.$$

* * * * *